United States Patent [19]

Fackenthall et al.

[11] Patent Number: 6,014,747

[45] Date of Patent: Jan. 11, 2000

[54] METHOD AND APPARATUS FOR SYSTEM'S AND CHASSIS PROTECTION UTILIZING SYSTEM MANAGEMENT INTERRUPTS

[75] Inventors: Aleph Fackenthall, Portland, Oreg.; David Harper, Lacey, Wash.; Joseph Bursey, Hillsboro, Oreg.; Brad Bickford, Beaverton, Oreg.; Brian G. Stern, Hillsboro, Oreg.

[73] Assignee: Intel Corporation, Santa Clara, Calif.

[21] Appl. No.: 08/941,520

[22] Filed: Sep. 30, 1997

[51] Int. Cl.[7] ............... G06F 13/00; G06F 3/00; G06F 1/16; G08B 13/14
[52] U.S. Cl. ............ 713/200; 700/297; 708/135; 708/139; 364/708.1; 340/568.3
[58] Field of Search ............ 395/186; 340/568.3; 312/236; 364/528.32, 709.09, 709.05, 708.1; 361/683; 713/200, 201; 700/297; 708/135, 139

[56] References Cited

U.S. PATENT DOCUMENTS

| 3,685,037 | 8/1972 | Bennett et al. ............... 340/280 |
|---|---|---|
| 4,262,337 | 4/1981 | Jones ............................ 364/709 |
| 4,319,228 | 3/1982 | Daniels ........................ 340/521 |
| 4,686,514 | 8/1987 | Liptak, Jr. et al. ............ 340/571 |
| 4,749,991 | 6/1988 | Davis et al. ................ 340/825.31 |
| 4,985,695 | 1/1991 | Wilkinson et al. ............ 340/571 |
| 5,406,261 | 4/1995 | Glenn ............................ 340/571 |
| 5,691,928 | 11/1997 | Okaya et al. .............. 364/709.05 |
| 5,757,616 | 5/1998 | May et al. ................... 361/683 |

*Primary Examiner*—Norman Michael Wright
*Attorney, Agent, or Firm*—Blakely, Sokoloff, Taylor & Zafman LLP

[57] ABSTRACT

A tamper detect device is provided to a chassis of a system. The tamper detect device provides a signal when the chassis is opened while at least a part of the system is under power. In one embodiment, the signal is used to produce an immediate warning. In another embodiment, the tamper detect device is incorporated into the system and the warning is audio. In another embodiment, the warning is continually provided until the chassis cover is closed, the system is unplugged, or the tamper detect device is bypassed. In another embodiment, the system is a computer system.

26 Claims, 3 Drawing Sheets

METHOD AND APPARATUS FOR SYSTEM'S AND CHASSIS PROTECTION UTILIZING SYSTEM MANAGEMENT INTERRUPTS

BACKGROUND OF THE INVENTION

1. Field of the Invention

The present invention pertains to the field of computer system. More particularly, this invention relates to the art of safeguarding computer system users and components from electrical hazards.

2. Background

Many computer systems continually use a very small voltage as long as the system is connected to a power source. The voltage is present even when the computer system appears to be off. This is commonly referred to as sleep mode. In sleep mode, the voltage is used primarily to run an internal clock or maintain a small internal battery.

When a computer system is in sleep mode, a user may not suspect that voltage is present within the system, and may open the chassis without unplugging the computer system. Generally, the small amount of voltage used by the clock and internal battery in sleep mode is not dangerous to the user. The small voltage is also generally insufficient to damage components if the components are removed or replaced by an unsuspecting user.

Since there is little danger to the user or the components in these systems in sleep mode, historically there has been no need to safeguard the user and the components. However, computer system administrators often have problems with unqualified users opening a computer chassis and disturbing the components inside. As a result, mechanisms have been used to inform computer system administrators of past unauthorized accesses. For instance, a computer system can use a switch to trigger a latch within the computer system when the chassis is opened. Only a small amount of power is needed for this, so the small internal battery is sufficient to set the latch. The next time the computer system is turned on, the latched value can be recorded in memory by system software making it is accessible by the system administrator.

Advances in computer systems, however, have led to computer systems that use a larger amount of voltage, even in sleep mode. As long as the computer system is plugged in, even in sleep mode, as much as 5 V can be present in the system. In this case, an unsuspecting user who opens the chassis may experience an uncomfortable and potentially dangerous electrical shock even when the computer appears to be off. Additionally, the voltage is likely to be enough to damage components if the components are removed or replaced while the system is plugged-in. Memory boards, for example, could be destroyed by inserting or removing them under power. Also, when inserting or removing a printed circuit board, the voltage could short to nearby pins damaging components and creating a shock hazard.

Therefore, it would be beneficial to provide a safeguard for the protection of users and system components against electrical hazards when a voltage is present in a computer system and the chassis is opened.

SUMMARY OF THE INVENTION

A tamper detect device is provided to a chassis of a system. The tamper detect device provides a signal when the chassis is opened while at least a part of the system is under power.

In one embodiment, the signal is used to produce an immediate warning. In another embodiment, the tamper detect device is incorporated into the system and the warning is audio. In another embodiment, the warning is continually provided until the chassis cover is closed, the system is unplugged, or the tamper detect device is bypassed. In another embodiment, the system is a computer system.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Figure 1:
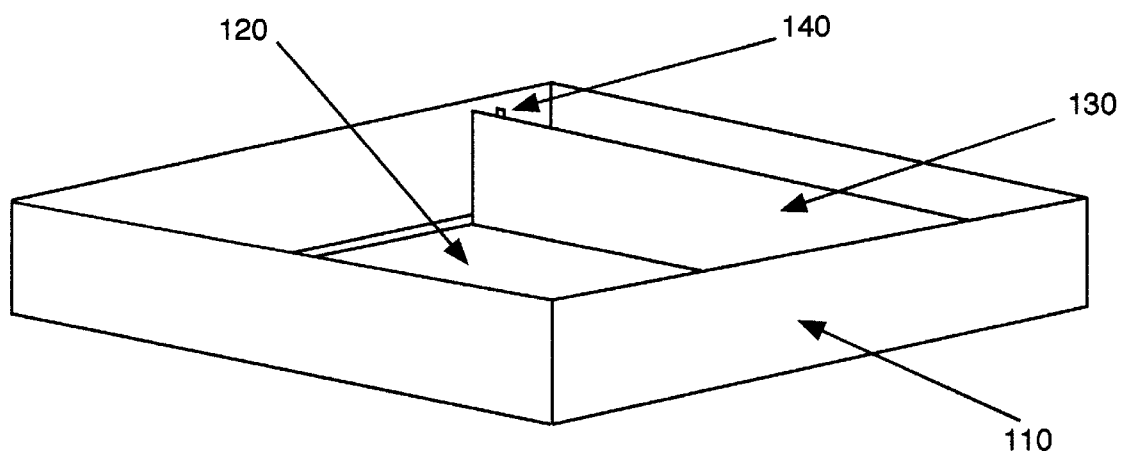
FIG. 1 illustrates one embodiment of a computer chassis containing a mother board and a riser board with an incorporated tamper detect switch in accordance with the present invention.
Figure 2:
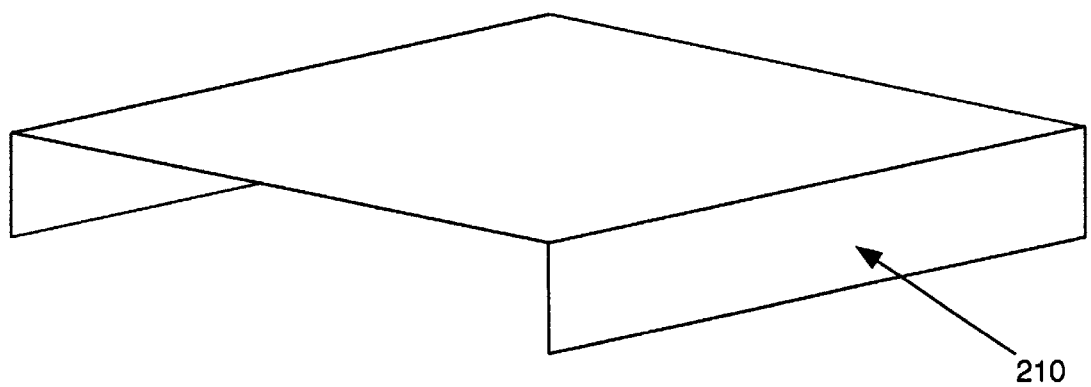
FIG. 2 illustrates one embodiment of a chassis cover operative to fit over the computer chassis and enclose the computer system.

FIGS. 1 and 2 together illustrate one embodiment of the present invention. In FIG. 1, computer chassis 110 is illustrated as forming a rectangular support structure that is open at the top for use to form a computer system. Mother board 120 and riser board 130 are illustrated as being contained within computer chassis 110. Together, mother board 120 and riser board 130 make up at least a subset of system components enclosed within the computer chassis 110. In accordance with the present invention, tamper detect switch 140 is provided to the computer system. For the illustrated embodiment, tamper detect switch 140 is disposed on riser board 130. Tamper detect switch 140 protrudes from the top of riser board 130. The chassis cover 210, shown in FIG. 2, fits over computer chassis 110 so that chassis cover 210 depresses tamper detect switch 140.

Figure 3:
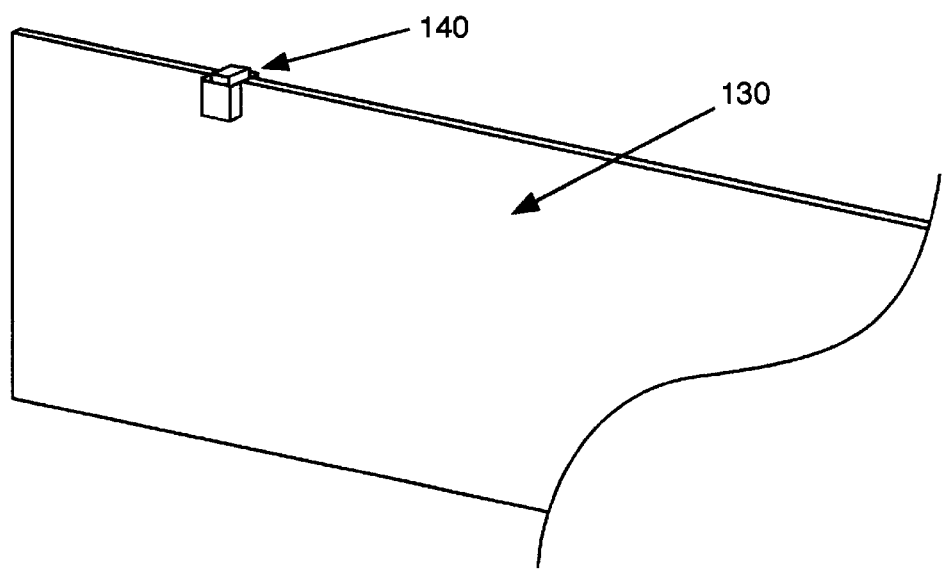
FIG. 3 illustrates one embodiment of a tamper detect switch incorporated into the riser board.

FIG. 3 illustrates one embodiment of tamper detect switch 140 incorporated into riser board 130. Riser board 130 fits into computer chassis 110. With chassis cover 210 in place, tamper detect switch 140 is depressed.

Figure 4:
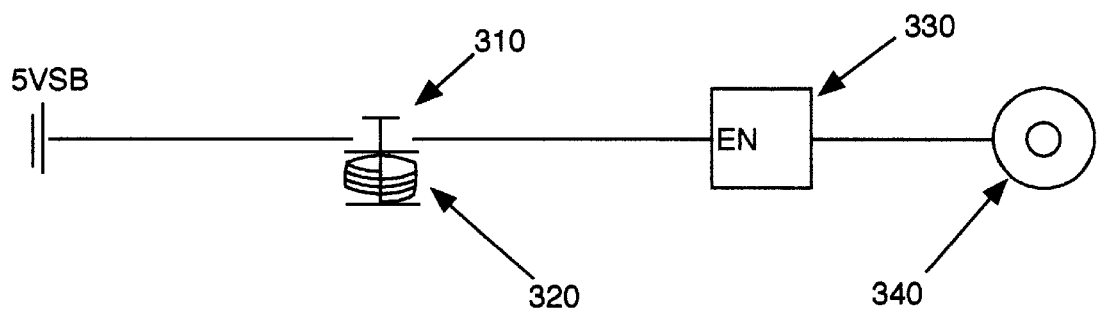
FIG. 4 illustrates one embodiment of a pressure deactivated tamper detect device.

FIG. 4 illustrates one embodiment of the tamper detect switch and alarm device 330. In FIG. 4, the tamper detect switch is a pressure deactivated switch consisting of push button 310 and spring 320. When the computer system is plugged in, a 5 V stand-by (5 VSB) is supplied to the computer system. The tamper detect switch electrically connects the 5 VSB to alarm device 330. With chassis cover 210 in place, push button 310 is depressed. With push button 310 depressed, the tamper detect switch is open and 5 VSB is not supplied to alarm device 330. If chassis cover 210 is lifted while the computer system is plugged in, pressure is removed from push button 310 and spring 320 closes the tamper detect switch. In this way, a 5 V tamper detect signal is supplied to the alarm device 330.

In one embodiment, the tamper detect switch is located on the top edge of riser board 130, and alarm device 330 and speaker 340 are located on mother board 120. When the tamper detect switch is closed, the tamper detect signal is provided to alarm device 330 on the mother board 120 via edge connector pins. Alarm device 330 is a DC buzzer circuit that is enabled by the tamper detect signal. When enabled, it produces an oscillating output. The output is provided to speaker 340 which is an approximately half-inch pizzo-electric transistor. The speaker 340 will continually emit a beeping sound until the computer system is unplugged, the chassis is replaced, or the tamper detect device is bypassed.

In another embodiment, the tamper detect device can be "bypassed." In this embodiment, a qualified user can operate the computer system with the chassis cover off for various diagnostic and experimental applications. Here, the tamper detect device has an enable jumper. For example, the jumper could be located between the tamper detect switch and the alarm device. The device can then be disabled by de-populating the tamper detect enable jumper, or, in other words, pulling the jumper off one of the tamper detect enable pins. As a result, the tamper detect signal is suppressed. Various other bypass embodiments may be employed.

In another embodiment, if the system is not in sleep mode, the tamper detect signal is also used to provide a system management interrupt (SMI) to the computer system. This allows the computer system to provide a response in addition to that provided by the alarm device. For example the computer system can display a message such as, "You have tried to remove the cover from your system with the power on. Please turn off your system and unplug it from the wall before removing the cover."

Figure 5:
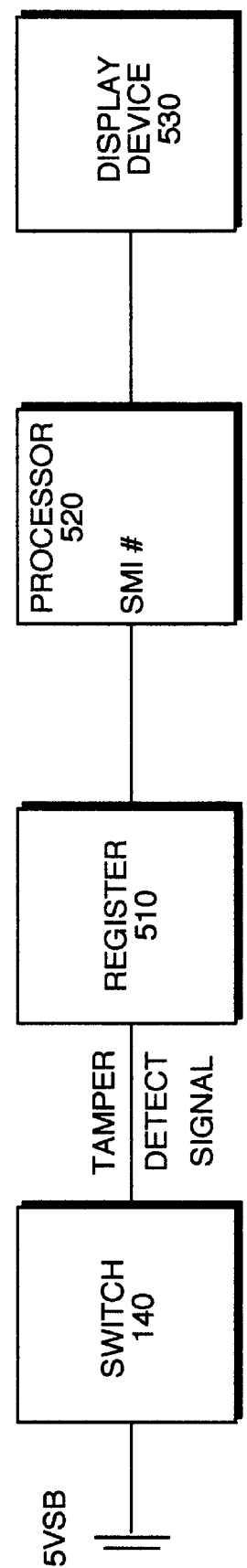
FIG. 5 illustrates one embodiment of a tamper detect signal generating a system management interrupt (SMI).

FIG. 5 illustrates one embodiment wherein the tamper detest signal is used to provide an SMI to the computer system. In the illustrated embodiment, when switch 140 is closed, the tamper detect signal is delivered to register 510 which latches the value. Register 510, in response, asserts a logic zero on the SMI# pin on processor 520. In response to the SMI, the processor enters System Management Mode (SMM), and the SMI handler polls register 510 to identify the source of the SMI. The SMI handler then initiates the process that displays the warning message on display device 530. The SMI handler repeatedly polls register 510 and exits SMM mode when the tamper detect signal is deasserted. Various other interrupt handling approaches may be employed. In one embodiment, the tamper detect switch is located on riser board 130, and register 510 and processor 520 are located on motherboard 120. The tamper detect signal is delivered to the mother board 120 via edge connector pins.

Alternately, if the computer system is in sleep mode, it could record the occurrence of a tamper detect signal in register 510 and not wake up. While the chassis cover is open, this approach is advantageous because of the additional power needed to wake the computer system. For this embodiment, the alarm device could provide immediate beeping and the computer system could remain in sleep mode. The next time the computer is manually powered up, the computer could provide a message such as, "The computer system cover was removed while the system was plugged in on Aug. 4, 1997 at 2:05 pm."

In another embodiment, the computer system could power-up automatically when the chassis cover is replaced or the tamper detect device is bypassed. In this case, de-asserting the tamper detect signal could be used to trigger a power-on switch for the computer system. Then, after the computer powered-up, the computer could temporarily provide a message such as, "You tried to remove the system cover while the system was plugged in. Turn off the system and unplug it before removing the cover."

If instead, the user unplugged the system when the user heard the beeping, the computer could display an appropriate message at the next power-up. Other appropriate messages could be used, for example, by portable computers with battery power supplies.

In other embodiments, the voltage supplied to the computer system could be any value. The voltage could also be provided by a rechargeable battery for a portable computer system. The computer chassis could be any three dimensional shape that holds computer components. The chassis cover could by any shape forming at least a partial enclosure with the computer chassis. The chassis cover could also be a removable lid or a hinged opening. The speaker could be a cone speaker or any other sound emitting device. The speaker could be located outside the computer chassis, incorporated into the computer chassis or chassis cover, or incorporated into the computer system. The alarm device could provide an optical signal, such as flashing a light emitting diode. The alarm device could also provide a mechanical signal, such as a pop-up flag. The tamper detect switch and alarm device could be incorporated, together or separately, into any computer component, computer chassis, or chassis cover. The tamper detect switch could be an optically activated switch, such as a light sensing diode. The switch could also be a magnetically or electrically deactivated switch which closes when a circuit is broken. The computer system could comprise a single printed circuit board, or it could include any combination of a mother board, riser boards, input/output devices, memory devices, processors, or any number of other computer system components.

In each embodiment, the present invention beneficially provides a warning that is designed to increase safety and reduce the likelihood that a user will unknowingly damage components of a computer system. The invention provides immediate feedback to the user if the user tries to remove the chassis cover when the computer system is under power. The invention can also utilize the computer system itself to provide detailed instructions about the hazards involved.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

What is claimed is:

1. An apparatus comprising:
  a plurality of system components;
  a chassis, including a chassis cover, to enclose the plurality of system components; and
  a tamper detect device to provide a tamper detect signal when the chassis cover is at least partially opened while at least a subset of the system components is under power, the tamper detect signal to generate an interrupt.

2. The apparatus of claim 1, wherein the tamper detect device comprises:
  a switch to close when the chassis cover is at last partially opened.

3. The apparatus of claim 2, wherein the switch comprises one of an optically activated electric switch and a pressure deactivated switch.

4. The apparatus of claim 2, wherein the switch is disposed on at least one of the plurality of system components and the chassis.

5. The apparatus of claim 1, wherein the tamper detect device comprises:

an alarm to respond to the tamper detect signal.

6. The apparatus of claim 5, wherein the alarm comprises one of an optical alarm, a mechanical alarm, and an audio alarm.

7. The apparatus of claim 5, wherein the audio alarm comprises one of a cone speaker and a pizzo-electric speaker.

8. The apparatus of claim 1, wherein the plurality of system components includes at least one of a printed circuit board, a riser board, an input/output device, a memory device, and a processor device.

9. The apparatus of claim 1, wherein the apparatus further includes circuitry for suppressing the tamper detect signal.

10. The apparatus of claim 1, wherein the plurality of system components comprise a computer system, and the computer system is to respond to the interrupt.

11. The apparatus of claim 1, wherein the interrupt is to bring the plurality of system components out of a sleep mode.

12. The apparatus of claim 1, wherein the interrupt comprises a system management interrupt (SMI) in the plurality of system components.

13. The apparatus of claim 12, wherein the plurality of system components are to display a message on a display device in response to the SMI.

14. The apparatus of claim 1, wherein the tamper detect device is powered by one of a portable battery and an external power source.

15. The apparatus of claim 1, wherein, during a sleep mode, the apparatus is powered by a stand-by voltage.

16. The apparatus of claim 15, wherein the stand-by voltage is 5 volts.

17. A method, comprising:

detecting an opening of a chassis cover of a chassis;

generating a tamper detect signal in response to detecting the opening if a system enclosed in the chassis is under power; and generating an interrupt in response to the tamper detect signal.

18. The method of claim 17, further comprising:

providing the tamper detect signal to an alarm; and activating the alarm in response to providing the tamper detect signal.

19. The method of claim 17, wherein generating the interrupt comprises:

providing the tamper detect signal to the system; and providing a response from the system.

20. The method of claim 19, wherein:

providing the tamper detect signal comprises latching the tamper detect signal in a system register, and providing the response comprises generating a system management interrupt (SMI) responsive to the latched tamper detect signal.

21. The method of claim 20, wherein providing the response further comprises generating an output message by a SMI handler on a system display device.

22. A computer system comprising:

a riser board to couple within a computer chassis; and a tamper detect switch to couple to the riser board, the tamper detect switch to produce a tamper detect signal when the computer chassis is at least partially opened while power is being supplied to the riser board, the tamper detect signal to generate an interrupt.

23. The computer system of claim 22, wherein the tamper detect switch comprises:

an alarm to respond to the tamper detect signal.

24. The computer system of claim 22, wherein the interrupt is to bring the computer system out of a sleep mode.

25. The computer system of claim 22, wherein the interrupt comprises a system management interrupt (SMI) in the computer system.

26. The computer system of claim 25, wherein the computer system is to display a message on a display device in response to the SMI.

* * * * *